(12) United States Patent
Donlan et al.

(10) Patent No.: US 6,952,836 B1
(45) Date of Patent: Oct. 4, 2005

(54) METHOD AND APPARATUS FOR MANAGING THE PROVISIONING OF CLIENT DEVICES CONNECTED TO AN INTERACTIVE TV NETWORK

(75) Inventors: Brian Joseph Donlan, Lynn Haven, FL (US); Randall George Rushe, Panama City, FL (US)

(73) Assignee: AT&T Corp., New York, NY (US)

( * ) Notice: Subject to any disclaimer, the term of this patent is extended or adjusted under 35 U.S.C. 154(b) by 887 days.

(21) Appl. No.: 09/671,329

(22) Filed: Sep. 26, 2000

(51) Int. Cl.⁷ .............................................. H04N 7/173
(52) U.S. Cl. ...................................................... 725/116
(58) Field of Search ............................ 725/1, 2, 4, 86, 725/93, 100, 105, 109, 110, 114, 115, 116, 117, 131; 709/246

(56) References Cited

U.S. PATENT DOCUMENTS

| | | |
|---|---|---|
| 5,481,542 A * | 1/1996 | Logston et al. ............. 725/131 |
| 5,485,221 A | 1/1996 | Banker et al. |
| 5,526,034 A | 6/1996 | Hoarty et al. |
| 5,539,450 A | 7/1996 | Handelman |
| 5,572,442 A | 11/1996 | Schulhof et al. |
| 5,592,551 A | 1/1997 | Lett et al. |
| 5,594,726 A | 1/1997 | Thompson et al. |
| 5,610,841 A | 3/1997 | Tanaka et al. |
| 5,751,707 A | 5/1998 | Voit et al. |
| 5,790,198 A | 8/1998 | Roop et al. |
| 5,880,720 A | 3/1999 | Iwafune et al. |
| 5,883,661 A * | 3/1999 | Hoarty .......................... 725/93 |
| 5,892,508 A * | 4/1999 | Howe et al. ................. 725/131 |
| 5,930,231 A | 7/1999 | Miller et al. |
| 6,002,394 A | 12/1999 | Schein et al. |
| 6,014,184 A | 1/2000 | Knee et al. |
| 6,041,056 A | 3/2000 | Bigham et al. |
| 6,502,242 B1 * | 12/2002 | Howe et al. ................. 725/109 |
| 6,564,308 B2 * | 5/2003 | Mann .......................... 711/167 |
| 6,615,408 B1 * | 9/2003 | Kaiser et al. ............... 725/112 |
| 6,738,982 B1 * | 5/2004 | Jerding ........................ 725/112 |
| 6,826,775 B1 * | 11/2004 | Howe et al. .................. 725/40 |
| 2002/0059586 A1 * | 5/2002 | Carney et al. ................. 725/35 |

* cited by examiner

*Primary Examiner*—Krista Bui
(74) *Attorney, Agent, or Firm*—Brooks Kushman P.C.

(57) ABSTRACT

The present invention is directed to a system and method for managing the provisioning of an client device connected to a service distribution network, such as an interactive television service-providing network. Provisioning is managed by a provisioning manager that knows the specific provisioning data to collect and where the data is located and is to be forwarded. The provisioning manager thus acts as an intelligent provisioning data traffic manager by performing as a central collection and dissemination point for the provisioning data and directing provisioning data flows between a billing system, IP data network, server complex and/or other network systems.

14 Claims, 13 Drawing Sheets

FIG. 3

| ELEMENT | FORMAT | SIZE | DESCRIPTION |
|---|---|---|---|
| SUBSCRIBER_ID | NUMERIC | | CSG ASSIGNED UNIQUE ITV KEY IDENTIFYING A SUBSCRIBER/ACCOUNT. |
| SUBSCRIBER_STATE | LITERAL | 10 | SUBSCRIBER ACCOUNT STATE (ACTIVE, SUSPENDED) |
| SUBSCRIBER.NAME.LAST | ALPHA | | SUBSCRIBER'S LAST NAME |
| SUBSCRIBER.NAME.FIRST | ALPHA | | SUBSCRIBER'S FIRST NAME |
| SUBSCRIBER.ADDRESS.STREET1 | A/N | | SUBSCRIBER'S RESIDENCE STREET1 |
| SUBSCRIBER.ADDRESS.STREET2 | A/N | | SUBSCRIBER'S RESIDENCE STREET2 |
| SUBSCRIBER.ADDRESS.CITY | A/N | | SUBSCRIBER'S RESIDENCE CITY |
| SUBSCRIBER.ADDRESS.STATE | A/N | 2 | SUBSCRIBER'S RESIDENCE STATE |
| SUBSCRIBER.ADDRESS.ZIP | A/N | 10 | SUBSCRIBER'S RESIDENCE POSTAL ZIP CODE |
| SUBSCRIBER.HEADEND.ID | A/N | | IDENTIFIER SPECIFYING TO WHICH HEADEND A SUBSCRIBER IS CONNECTED |
| SUBSCRIBER.HEADEND.NODE | A/N | | IDENTIFIES TO WHICH NODE ON A HEADEND A SUBSCRIBER IS CONNECTED |
| SUBSCRIBER.SERVICE.TYPE | A/N | 16 | A SUBSCRIBER SERVICE TYPE |
| SUBSCRIBER.SERVICE.LEVEL | A/N | 16 | A SUBSCRIBER SERVICE LEVEL |
| SERVICE_GROUP | NUMERIC | | THE SERVICE SERVER INFRASTRUCTURE DEFINED SERVICE GROUP ASSOCIATED WITH THE SUBSCRIBER |
| MSTV_SUBSCRIBER_ID | NUMERIC | | THE SERVICE SERVER INFRASTRUCTURE DEFINED UNIQUE KEY ASSOCIATE WITH THE SUBSCRIBER |

FIG. 4

| ELEMENT | FORMAT | SIZE | DESCRIPTION |
|---|---|---|---|
| USER_ID | NUMERIC | | ITV PM UNIQUE KEY IDENTIFYING A USER |
| USER_STATE | LITERAL | 10 | USER STATE (ACTIVE, SUSPENDED) |
| USER.TYPE | LITERAL | 10 | TYPE OF USER (MASTER, HOUSEHOLD, NORMAL) |
| USER.NAME.LAST | ALPHA | | USER'S LAST NAME |
| USER.NAME.FIRST | ALPHA | | USER'S FIRST NAME |
| USER.ALIAS | ALPHA | | USER'S ALIAS (E.G. "DAD", "MOM") WHICH MUST BE UNIQUE ONLY WITHIN A HOUSEHOLD/SUBSCRIBER |
| USER.PIN | NUMERIC | 8 | USER'S PERSONAL IDENTIFICATION NUMBER WHICH IS USED FOR AUTHENTICATION WITH THE ITV SYSTEM |
| USER.EMAIL.ID | A/N | | USER'S EMAIL ADDRESS, FULLY QUALIFIED (E.G. SMITH@ATT.NET) |
| USER.EMAIL.PASSWORD | A/N | | USER'S EMAIL PASSWORD, USED TO AUTHENTICATE WITH MAIL AND RELATED SERVICES |
| USER.CALENDAR.ID | A/N | | USER'S CALENDAR ID. FOR FCS THIS WILL BE THE SAME AS EMAIL ID |
| USER.CALENDAR.PASSWORD | A/N | | USER'S CALENDAR PASSWORD, USED TO AUTHENTICATE WITH THE CALENDAR SERVICE |
| USER.ADDRESS_BOOK.ID | A/N | 16 | UNIQUE ADDRESS BOOK IDENTIFIER |
| USER.SERVICE.TYPE | A/N | 16 | A SUBSCRIBER SERVICE TYPE |
| USER.SERVICE.LEVEL | A/N | | A SUBSCRIBER SERVICE LEVEL |
| MSTV_USER_ID | NUMERIC | | THE SERVICE SERVER INFRASTRUCTURE DEFINED UNIQUE KEY ASSOCIATED WITH THE USER |

| ELEMENT | FORMAT | SIZE | DESCRIPTION |
|---|---|---|---|
| ASTB_ID | A/N | | ITV PM UNIQUE SET-TOP BOX KEY |
| ASTB.UNIT_ADDRESS | A/N | | MOTOROLA/GI UNIQUE "UNIT ADDRESS" |
| ASTB.MAC_ADDRESS | A/N | 17 | MOTOROLA/GI UNIQUE MAC ADDRESS FOR ASTB CPE |
| MSTV_DEVICE_ID | NUMERIC | | SERVICE SERVER INFRASTRUCTURE DEFINED UNIQUE KEY ASSOCIATED WITH THE STEP-TOP BOX |

*FIG. 5*

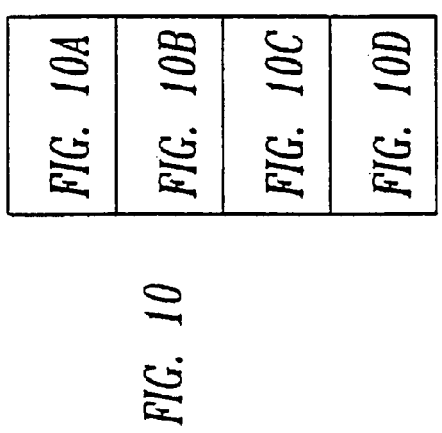
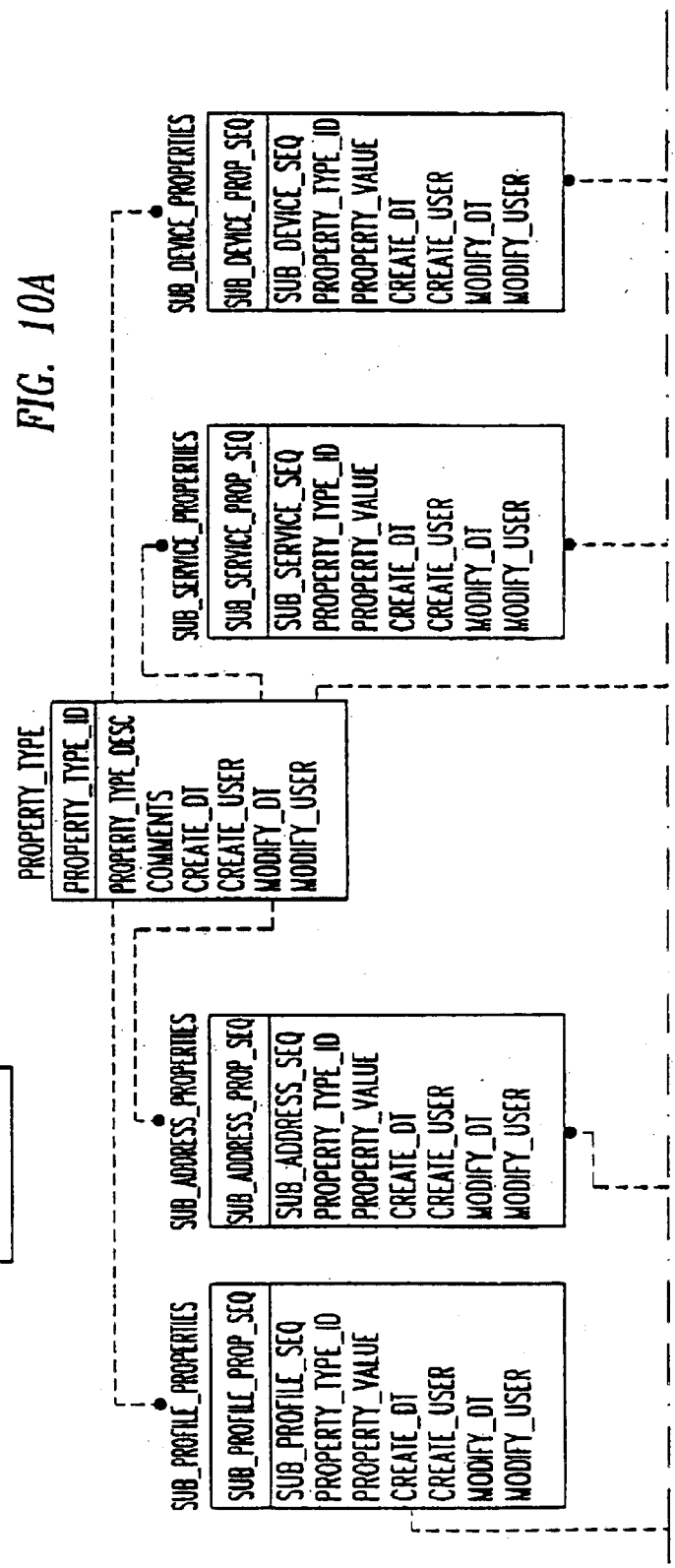
FIG. 10A

METHOD AND APPARATUS FOR MANAGING THE PROVISIONING OF CLIENT DEVICES CONNECTED TO AN INTERACTIVE TV NETWORK

FIELD OF THE INVENTION

The invention relates generally to a method and apparatus for managing the provisioning of a telecommunication network and specifically to a method and apparatus for managing the provisioning of an interactive television (ITV) network and the associated ITV client devices connected thereto.

BACKGROUND OF THE INVENTION

Implementation and operation of a communications service, whether it be a voice, video or data communications service, requires the interconnection of a plurality of networks, systems, devices and equipment, which may be geographically co-located or separated. Presently, each of these networks, systems, devices and equipment may need to be "provisioned" to enable the establishment of a communications connection path. In general, "provisioning" is the addition of a subscriber (e.g., a subscriber terminal device and/or network component) to, deletion of a subscriber from, or modification of a subscriber's services provided by a network, system, or other type of infrastructure providing entitled services. Provisioning permits the pertinent architecture to recognize and/or communicate with the subscriber.

Some form of provisioning is necessary, whether the communications connection path connects a plurality of subscriber terminal devices (e.g., telephones, televisions, streaming media players, set-top box audio/video decoders, wireless device base station, etc.), as in a telephone, data or audio or video distribution network, or whether the path connects one or more subscriber terminal devices (e.g., work stations, personal computers, PDA, etc.) with one or more servers, as in a client-server computing network. In many operational situations, each of the interconnected plurality of networks, systems, devices and equipment may need to be provisioned independently and separately (either manually with human intervention or automatically), thereby resulting in potential time delays, inefficiencies, or errors in enabling the subscriber terminal to connect to and use the communications network services.

As a type of communications network, an interactive television (ITV) network and subscriber terminal devices connected thereto must be "provisioned" to enable the subscriber terminal devices to use ITV services via the ITV network. Subscriber terminal devices, which are ITV client devices connected to the ITV network, may include television sets, set-top audio/video decoder boxes, personal computers, and video recorders, among other video, audio and data devices. The convergence of television transmission networks, IP (i.e., Internet Protocol) data networks, and distributed client-server computing networks to implement an operational ITV network necessitates the interconnection of a plurality of networks, systems, devices and equipment, which may be geographically co-located or separated, as components of the ITV network as a whole. Presently, each of these component interconnected networks, systems, devices and equipment must be independently and separately "provisioned" to enable the establishment of a communications connection path and the use of the ITV network by an ITV client device (i.e. subscriber terminal) for entitled ITV services.

Accordingly, there exists a need for a method and apparatus for commonly (i.e. as a whole) managing the automatic provisioning of all of these interconnected component networks, systems, devices and equipment comprising the entire ITV network.

SUMMARY OF THE INVENTION

The present invention provides a client-network provisioning manager for managing the provisioning of a telecommunication service network and a plurality of client devices connected to the network for using the telecommunication services. The teachings of the present invention are applicable to a broad variety of subscriber telecommunication services and/or pay-for-use services, including interactive television, cable television, telephone, video, audio, on-line databases, noninteractive television, radio, music video, videojuke box, pay-for-view, video-on-demand, home-shopping, video conferences, telephone conferences, interfacing to imaging systems, automatic telephone call charge-backs ("900" numbers) and other telecommunication services. The teachings are also applicable to a variety of telecommunication systems, including multi-channel telecommunication services, single channel multi-service telecommunications, and single channel single service telecommunications. As will be appreciated from the foregoing, the user may be a subscriber or nonsubscriber.

The provisioning manager of the present invention communicates with the individual provisioning methods/apparatus of each of the network components for the purpose of effectuating the overall provisioning of the client devices with all of the necessary network components in a coordinated, common (i.e., as a whole), and automated manner. By knowing the specific provisioning data to collect, where the data is found and is to be forwarded, the provisioning manager acts as an intelligent provisioning data manager by performing as a central collection and dissemination point for the provisioning data, directing provisioning data flows between the provisioning methods/apparatus of the individual network components. As such a central point, the provisioning manager makes the automatic provisioning process more efficient. In one configuration the provisioning manager insures that dependent transactions (of each request/response transaction which are typically handled independently) are made in the correct sequence. For example, a "user-add" request is not issued until the related "subscriber-add" request has completed successfully.

Although the present invention is described as a central collection and dissemination point, the methods and apparatus described may be implemented as an independent unit coupled to the network, or may be distributed throughout the network.

The provisioning manager includes a user interface for use by customer support representative personnel, as well as application programming interfaces ("API(s)"), protocol and signal interfaces to the individual provisioning methods/apparatus of the respective network components. The type of information managed by the provisioning manager includes, but is not limited to, data related to: IP provisioning of the client device for IP communication with the network; centralized provisioning from controlled data centers; support for self-provisioning of capabilities delivered to the client device; subscribers' services enrollment and entitlement; installation of the client device; and the provisioning process flow.

Message communications transactions between the provisioning manager and the provisioning systems of the other network components, e.g., the billing system, the various servers, the IP data network, and such other network components forming the ITV network, are conducted via appropriate protocol and signal interfaces and APIs defined for each respective network component provisioning system. The message communications transactions are stored in a provisioning manager database.

The teachings of the present invention are particularly applicable to an interactive television (ITV) network having an ITV provisioning manager. The ITV network comprises a plurality of component interconnected networks, systems, devices and equipment. The component interconnected networks, systems, devices and equipment (the "ITV network component(s)") include, but are not limited to, analog or digital television transmission networks, IP (i.e. internet protocol) data networks, distributed client-server computer networks, subscriber management billing systems, and one or more ITV client devices, which may be geographically co-located or separated. ITV client devices include, but are not limited to, set-top video/audio converter decoder boxes, television receivers, video/audio recorders or players, data modems and computers which can process video, audio or data signals for transmission, storage, visual display or sound emission.

In one configuration, operators/providers of the ITV services are different business entities separate, distinct and independent from each of the ITV network component operators/providers.

In one configuration, one or more of the ITV network components has its own independent, respective provisioning methods or apparatus particular to that component's function in the ITV network. Such methods or apparatus may represent only a fractional part of the overall provisioning functions necessary to provision the ITV client devices and/or the ITV network as a whole.

In one configuration, a method of managing the provisioning of interactive client devices includes the steps of:

(a) receiving from the billing system (subscriber management system) a registration code number and associated billing system identification data relating to the subscriber (e.g., ITV client device), the registration code number being associated with billing system identification data identifying the subscriber, the billing system identification data describing the billing information and services preferences of the subscriber;

(b) storing the registration code number and associated billing system identification data in a provisioning management database;

(c) retrieving the billing system identification data in the provisioning management database; and (d) communicating the billing system identification data to the provisioning system of an IP data network.

In another configuration, the method includes the steps of:

(a) receiving from a first ITV network component service information relating to the subscriber, the service information identifying the subscriber and describing at least one service preference of the subscriber;

(b) determining which of a plurality of other ITV network components are to receive at least some of the service information;

(c) communicating the at least some of the service information to a second ITV network component, the second ITV network component being different from the first ITV network component and providing a service requested by the subscriber;

(d) receiving from the second ITV network component service providing information, the service providing information enabling the subscriber to access the service provided by the second ITV component; and (e) providing the service providing information to the subscriber. The above-described operation is exemplary, and the individual provisioning and intercommunication of messages between the provisioning manager and the other network components may be conducted in alternative orders of occurrence without departing from the spirit and scope of the present invention. Moreover, the above description of configurations and/or embodiments of the present invention is neither exhaustive nor limiting. As will be appreciated, the features of the present invention can be combined in a variety of other ways, which are within the spirit and scope of the present invention.

BRIEF DESCRIPTION OF THE DRAWINGS

The present invention is described in detail with regards to the following figures, in which like elements are referred to with like numerals, and in which:

FIGS. 3–5 are exemplary data structures for the data items exchanged between the ITV Provisioning Manager and the service server infrastructure;

DETAILED DESCRIPTION

The ITV Network

Figure 1:
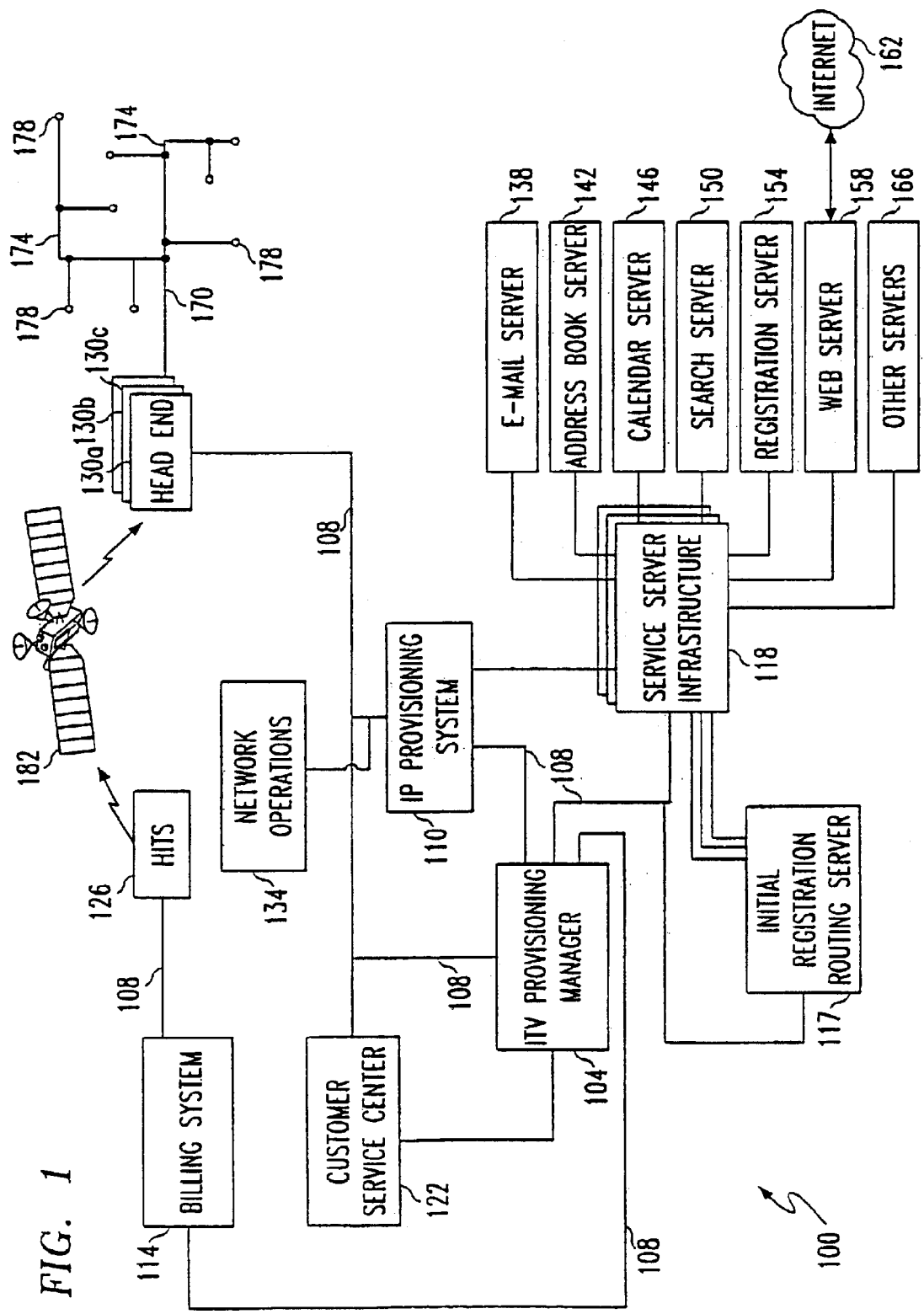
FIG. 1 is an exemplary block diagram of an ITV Network according to the present invention.

FIG. 1 is an exemplary block diagram of an ITV Network 100 according to the present invention. As shown in FIG. 1, the overall ITV Network comprises a plurality of interconnected networks, systems, devices and equipment, which may be geographically co-located or separated. For the purposes of discussion, these interconnected networks, systems, devices and equipment are referred to collectively as "ITV Network Components" and individually as an "ITV Network Component". Each ITV Network Component may include its own respective provisioning system, method or apparatus; and, for the purposes of discussion, reference to an ITV Network Component includes reference to its respective provisioning system, method or apparatus.

The ITV Provisioning Manager 104, via one or more communications link(s) 108, interconnects and communicates with ITV Network Components including, but not limited to, at least one IP provisioning system 110, at least one subscriber management billing system 114, at least one service server infrastructure 118a–c, customer service center 122, head end in the sky or HITS 126, one or more head ends 130a–c, and network operations 134, and other required additional ITV Network Components (not shown) comprising the ITV Network 100.

Each of the service server infrastructures 118*a–c* includes or is connected to a plurality of application, content, and/or control servers. The servers provide or control the provision of selected services to a subscriber. Examples of such servers include an e-mail server 138 to send and receive e-mail, an address book server 142 to enter and retrieve address information from the subscriber's personal records, a calendar server 146 to enter and retrieve calendar or scheduling information from the subscriber's calendaring records, a search server 150 to perform network-related searches, a registration server 154 to register new subscribers in the corresponding server infrastructure, a web server 158 to provide connection to the internet 162, and other servers 166 providing any number of other services (e.g., a home page server, chat server, and messaging server).

The service server infrastructures are each assigned to serve a number of subscribers having selected common attributes. In one configuration, the service server infrastructures each serve subscribers from a unique geographical area.

Each of the head ends 130*a–c* is connected to a distribution network including various feeders 170 and branches 174 and connections to subscriber locations or nodes 178. At each subscriber location or node 178, an ITV client device (not shown) is located.

As will be appreciated, an ITV client device can access a number of services. For example, the subscriber can access programming material for the subscriber's television. The material is transmitted by the HITS 126 via satellite 182 to a head end 130*a–c* and via feeder 170 and branch 174 to the subscriber's client device. The subscriber can also access any of the services provided by the service server infrastructure. The services are accessed via branch 174, feeder 170, and link 108.

The numbering of ITV Components 104–166 is not intended to be a limitation on the number of additional ITV Components comprising the ITV Network 100; and the preferred embodiment of the present invention contemplates any number of ITV Network Components comprising the ITV Network 100.

Link(s) 108, feeder(s) 170 and branch(es) 174 may include any combination of one or more wired or wireless, electrical or optical connections or telecommunications data networks, whether packet or circuit switched, global, national, regional, wide-area, local area, or in-home networks, without departing from the spirit and scope of the present invention. Similarly, the IP provisioning system can provision any IP data network that may be implemented on any combination of one or more wired or wireless, electrical or optical connections or telecommunications data networks, whether packet or circuit switched, global, national, regional, wide-area, local area, or in-home networks.

The ITV Provisioning Manager

Figure 2:
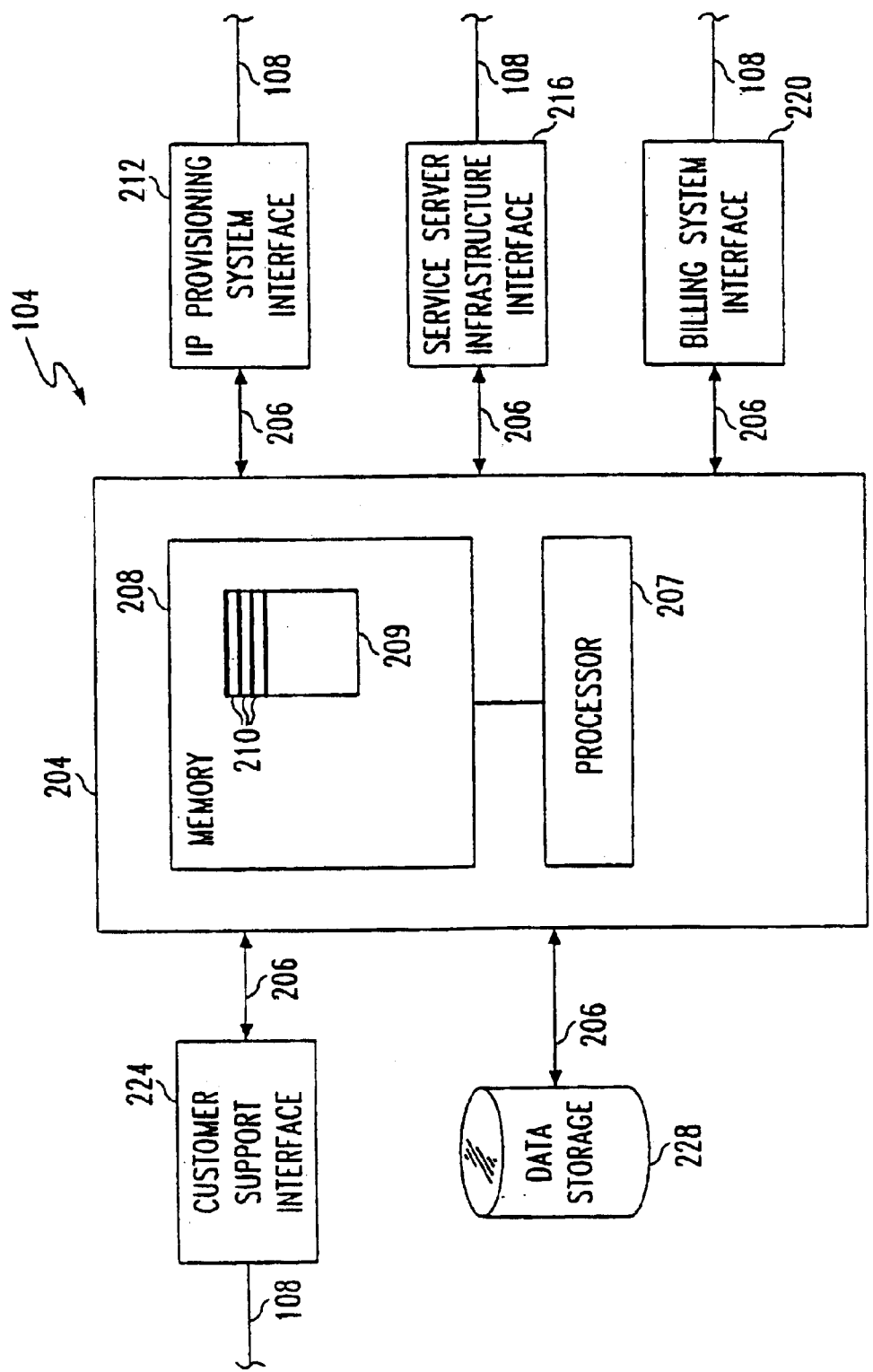
FIG. 2 is an exemplary diagram of provisioning message interfaces of the ITV Provisioning Manager device of FIG. 1.

FIG. 2 is an exemplary block diagram of an ITV Provisioning Manager device 104. The ITV Provisioning Manager device 104 includes a controller 204 (which includes processor 207 and memory 208), an IP provisioning system message interface (server) 212, a service delivery infrastructure message interface (server) 216, a billing system message interface (server) 220, a customer support message interface (server) 224 (through which a customer support representative in the customer service center 122 operates and communicates with the ITV Provisioning Manager 104), and an ITV provisioning data storage-228. As will be appreciated, an "interface" is a connection between two systems through which information is exchanged, e.g., a standard format for exchanging data. The above components are coupled together through control, address and data buses 206. The various message interfaces 212, 216, 220, and 224 may be a single interface type or a plurality of interface types, each of which communicates messages to an ITV Network Component 110, 118,114, and 122, respectively, using one or more signal types, protocols and APIs (application programming interfaces) appropriate to the appropriate ITV Network Component. The ITV Provisioning Manager 104 in its entirety, or its various components, e.g., the controller 204, message interfaces 212,216,220, and 224, or data storage 228, may be implemented as independent units connected to the ITV Network 100, or may be distributed throughout the ITV Network 100, manifested in whole or in part, as a plurality of devices or as constituent parts of other ITV Network Components 104–166. For example and without limiting any location alternatives, the ITV Provisioning Manager 104, in whole or in part, may be located in a cable TV system headend (e.g., headend 130, a telephone central office, a satellite up-link center (e.g., HITS 126), a broadcast studio, a server complex (e.g., service server infrastructure 118), and/or a data center (e.g., billing system 114 and/or customer service center 122).

The controller 204 stores provisioning message communications transactions in one or more database(s) contained in data storage 228. Data storage 228 may include semiconductor memory, as well as magnetic, electrical or optical mass storage devices or combinations thereof, without departing from the spirit and scope of the present invention.

The one or more provisioning message interface(s) 212, 216, 220, and 224 may be implemented using proprietary protocols specially developed for the present invention, or industry-standard protocols widely known in the art, including, but not limited, to any combinations of XML (i.e., extended mark-up language), LDAP (i.e., Light-Weight Directory Protocol), SQL (i.e. Structured Query Language), WTVP (ie., Web TV Protocol), HTTP (i.e., hypertext transport protocol), HTML (i.e., hypertext markup language), DLLs (i.e., dynamic link libraries), ODBC (i.e., Open Database Connectivity), RDBMS (i.e., remote data base management system), RDO (i.e., Remote Data Objects), ADO (ie., Active-X Data Objects), and COBRA (i.e. Common Object Resource Broker Architecture).

Figure 10B:
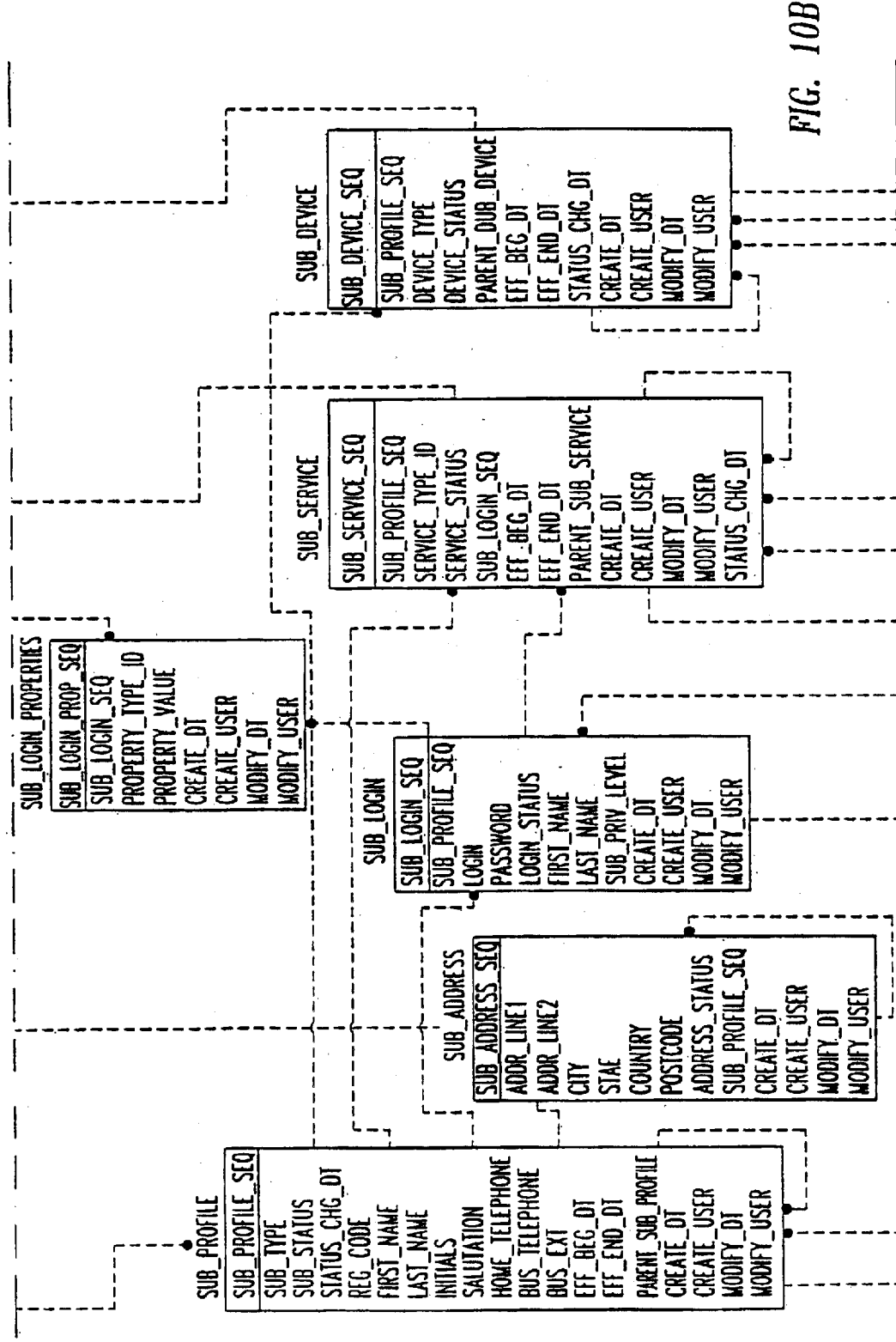
FIG. 10 is a diagram showing the database schema of the database stored on data storage device 228 of FIG. 2.
Figure 10C:
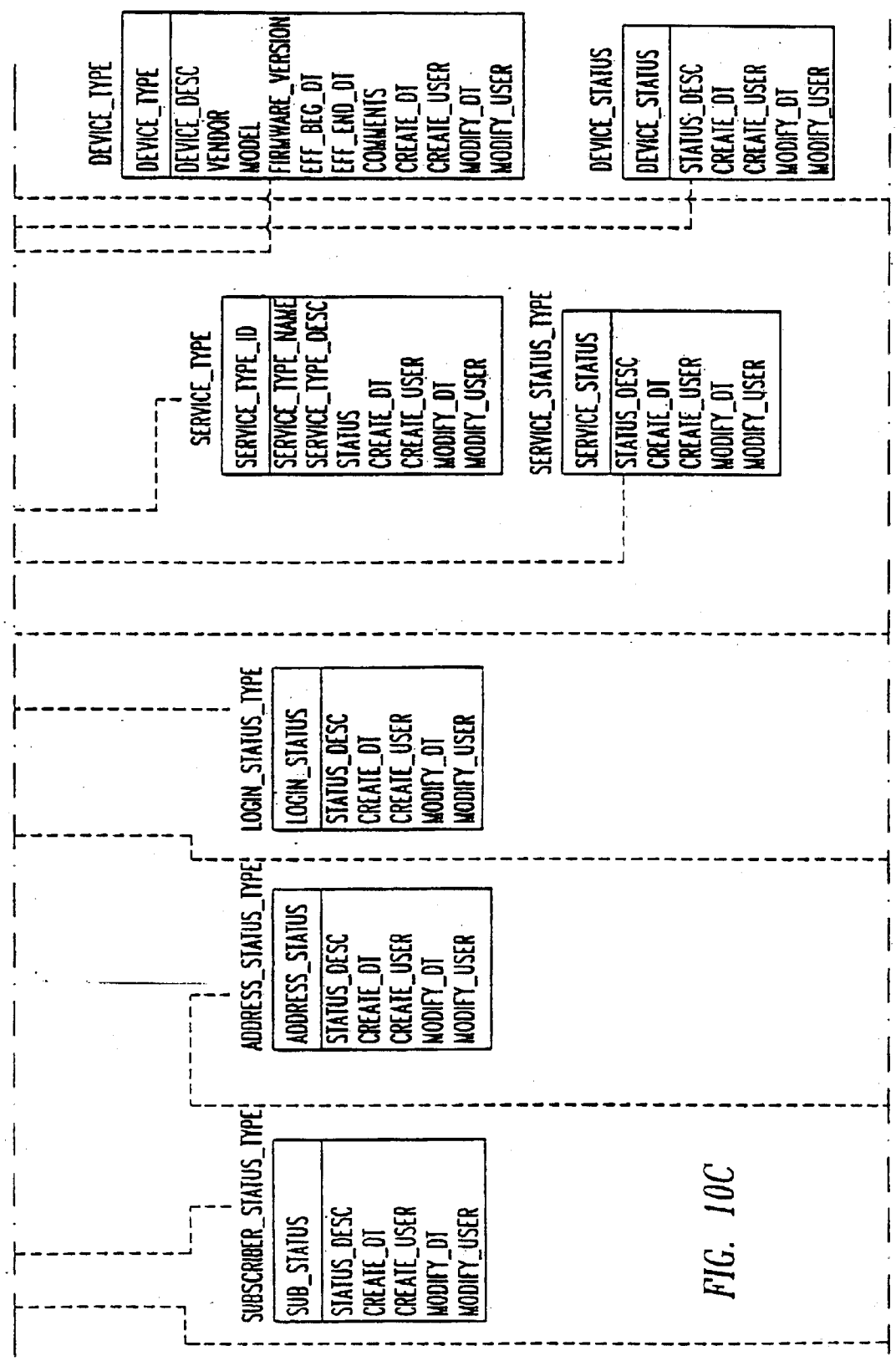
Figure 10D:
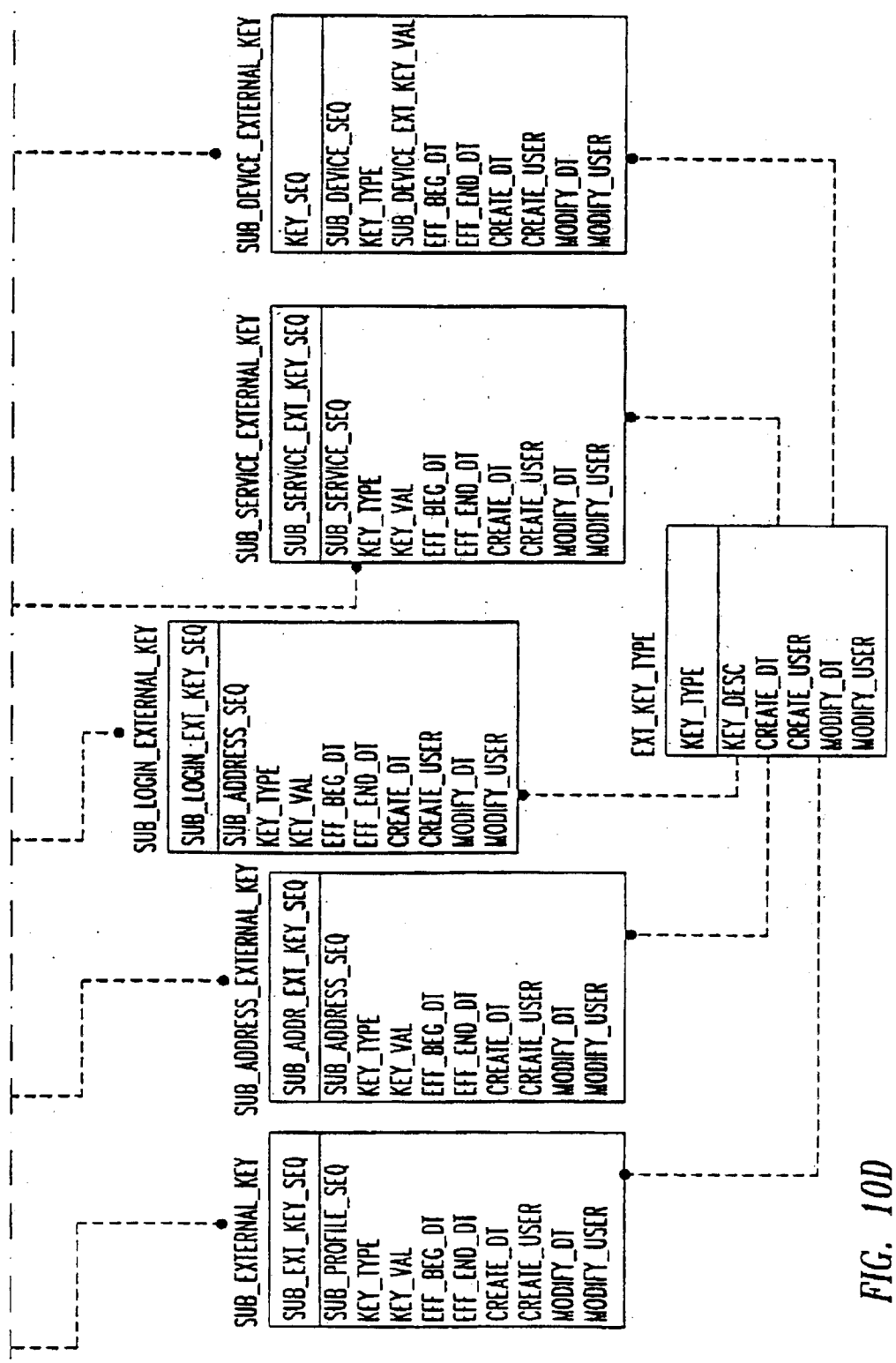

FIG. 10 is a diagram showing the database schema of the database stored on data storage device 228 of FIG. 2. FIGS. 3, 4, and 5 disclose exemplary data structures for the data items exchanged between the ITV Provisioning Manager and the service server infrastructure. FIG. 3 relates to data structures related to the provisioning of subscribers; FIG. 4 to data structures related to the provisioning of users within a subscriber's household or account; and FIG. 5 to data structures related to the provisioning of a set-top box in a subscriber's household or affiliated with the subscriber's account. As is evident from FIGS. 3–5, a subscriber must be defined before any ITV network component can be provisioned. In some applications, a subscriber can have multiple dwellings or households.

Referring again to FIG. 2, the controller memory 208 includes one or more queues 209 containing one or more transactions 210. If the ITV provisioning manager 104 determines that an ITV network component is unavailable during the provisioning process, the manager 104 will suspend or queue the transactions(s) for transmission at a later time. Likewise if the ITV provisioning manager 104 is unavailable, otherITV network components will queue the transactions for transmission at a later time.

In operation, the controller 204 communicates through the message interface(s), via the communications link(s) 108, with an ITV Network Component 104–166, data messages containing provisioning-related information including, but not limited to, customer order registration code(s), ITV client device unit address(es), IP address(es), medium access control or MAC address(es), billing system identification number(s), server registration assignment(s), and the like.

The Provisioning Process

Figure 6:
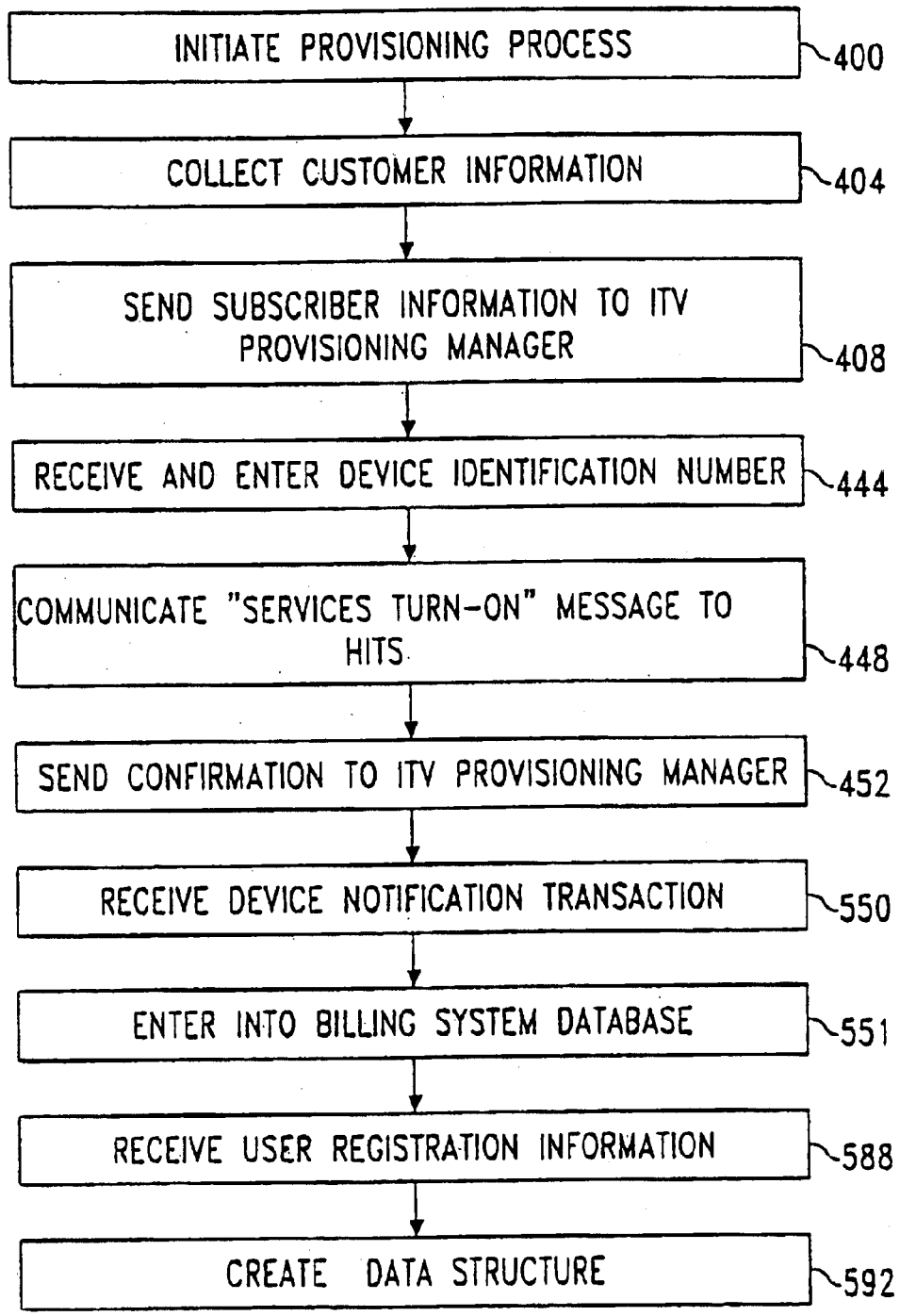
FIG. 6 is a flowchart of the provisioning process steps performed by a billing system of the ITV network.

Referring to FIG. 6, the provisioning process is initiated at box 400. The typical event leading to the provisioning of a new subscriber is a customer calling the ITV operator's support center to initiate a new service to a household. The process is also applicable to a current subscriber requesting a second set-top box installation or a conversion from an older set-top box to a newer set-top box. For a new subscriber, a customer support representative ("CSR") and the customer determine in box 404 the ITV services and/or service package that the customer desires. The CSR verifies that the services and/or service package are available at the customer's location. The customer identification (name, address, etc.) and selected services or package (e.g., video, audio, and/or data services) are entered into the subscriber management billing system 114, which is an ITV network component. The customer is assigned a unique registration code (which is used on a temporary basis to initialize the set-top box), a unique subscriber key (which is used identify the customer in the database of the billing system 114), an installation technician and truck are scheduled, with the registration code included on an installation work order, or, in some circumstances, the customer may install the ITV client device himself/herself.

Referring to FIGS. 1–10, during or after the order entry process the entered customer or subscriber information in box 408 is sent by the billing system 114 (via billing system interface 220) to the ITV provisioning manager 104. This information includes without limitation the registration code, the subscriber key, name, home phone, business phone, the identity of the service(s) or package(s) selected, and address. As will be appreciated, services may be defined per subscriber, per user, and/or per client device. In box 412 (FIG. 7), the ITV provisioning manager receives the information and enters the information into data storage 228.

In boxes 416 and 420 (FIG. 7), respectively, the ITV provisioning manager typically forwards all of the information received from the billing system 114 to the IP provisioning system 110 (via IP provisioning system interface 212) and the subscriber key, customer name, zip code, and headend code to the central initial registration routing server 117 (via service delivery infrastructure interface 216). As noted, a plurality of service server infrastructures are typically connected to the network, and, in box 424 (FIG. 9) the initial registration routing server 117 receives the subscriber information and in box 428 (FIG. 9) assigns the appropriate infrastructure to the customer. In box 426 (FIG. 8), the IP provisioning system receives and records the subscriber information. The ITV provisioning manager may communicate messages relating to provisioning, registration, and billing system identification to the respective provisioning systems of as many ITV network components as are necessary to comprise the ITV network, storing the messages and/or other details of each such communication transaction in the ITV provisioning manager data storage 228.

In box 432 (FIG. 9), the initial registration routing server 117 responds by sending (via interface 216) a message(s) indicating to which service server infrastructure 118 the customer is assigned and a unique subscriber id for purposes of identifying the customer in the infrastructure 118. In boxes 436 and 440 (FIG. 7), the information is received from the server 117 and entered into data storage 228. Although not shown in the flow chart, other network components, such as the IP provisioning system 110, could provide similar provisioning, registration, and/or billing system information to the ITV provisioning manager 104 in response to message(s) received from the provisioning manager 104. In that event, the manager 104 would enter such information into data storage 228.

In box 444 (FIG. 6) after the ITV client device, which is a set-top box in this application, is installed by the installation technician or customer, the ITV client device identification number (e.g. a unit address) is called in via telephone to the CSR. In box 444 (FIG. 6), the CSR enters the device identification or serial number into the billing system, which binds the set-top box to the customer account. In box 448 (FIG. 6), the billing system 114 communicates a "services turn-on" message to HITS 126, thereby turning on the TV services that the customer has selected. HITS 126 relays the message via feeder 170 and branch 174 to the appropriate head end 130 connected to the set-top box.

Figure 7:
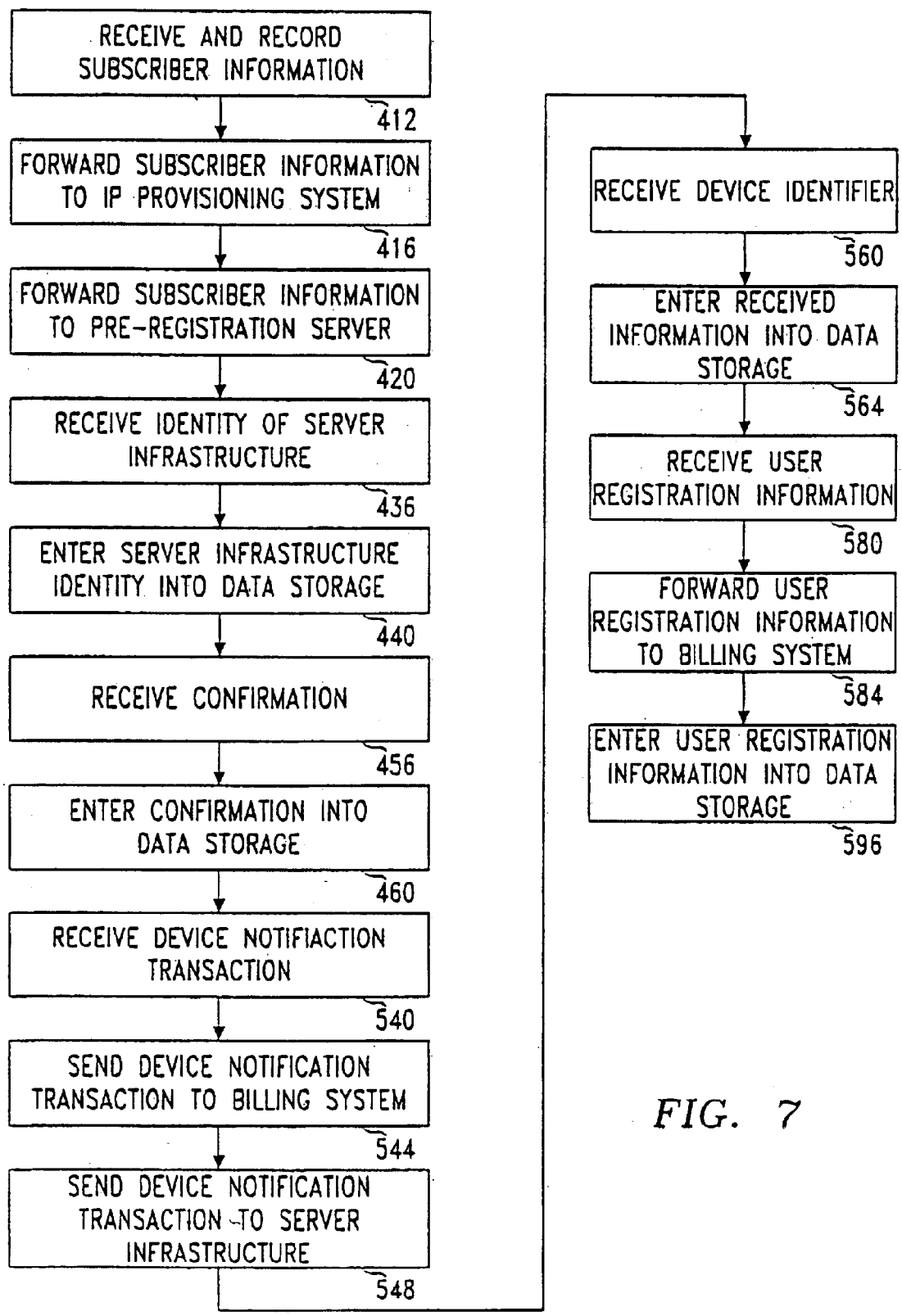
FIG. 7 is a flowchart of the provisioning process steps performed by the ITV provisioning manager.

In box 452 (FIG. 6), the billing system 114 may also send a message confirming this turn-on message to the ITV Provisioning Manager 104, which receives the messege in box 456 (FIG. 7) and stores this transaction in data storage 228 in box 460 (FIG. 7). This message confirms that the set-top box is assigned to the specific customer.

In boxes 465 and 468 (FIG. 8), the head end 130 and IP provisioning system 110, respectively, establish MAC (medium access control) layer and IP (internet protocol) layer connectivity with the set-top box, assigning the set-top box modem a temporary IP address.

Regarding the establishment of MAC layer connectivity, the standard procedure for establishing MAC layer connectivity with the head end 130 is set forth in DOCSIS specification SP-RFI-I05-991105 and will only be briefly discussed in this application. As will be appreciated, MAC layer connectivity is established by scanning for a downstream channel and establishing Quadrature Amplitude Modulated ("QAM")/packet synchronization with the respective head end 130, obtaining upstream channel transmission parameters, and performing upstream ranging.

Likewise, the standard procedure for establishing IP layer connectivity with the IP provisioning system 110 is set forth in DHCP specifications (RFC-2131) and will only be briefly discussed in this application. As will be appreciated, the set-top box modem broadcasts a DHCPDISCOVER packet (which contains the set-top model identification and the set-top unit address) to a server (not shown) in IP provisioning system 110, the server responds by granting the set-top box modem a temporary IP address that is routable only to an IP provisioning system server and providing the set-top box modem with the IP address of the Trivial File Transfer Protocol ("TFTP") server (in the IP provisioning system 110), the IP address of the Time-of-Day ("TOD") server (in the IP provisioning system 110), and the IP address of the system log ("SYSLOG") server (in the IP provisioning system 110).

In box 472 (FIG. 8), the set-top box modem is placed in the "Unprovisioned Modem" state.

In box 476 (FIG. 8), the IP provisioning system 110 system database (not shown) is updated with the DHCP package including the MAC address, the set-top unit address (which is an electronic identifier that is different from the unit's serial number which was previously provided to the ITV provisioning manager 104), and the assigned private IP address of the modem.

In box 480 (FIG. 8), the modem contacts the TOD server to obtain the current date and time (for time stamping purposes) and the TFTP server to download a file containing configuration parameters (which includes class of service configuration settings, baseline privacy settings, software upgrade file name(s), modem description of capabilities, and message integrity checks (e.g., checksums)), registers with the head end 130, and initializes baseline privacy.

In boxes 464 and 488 (FIG. 8), the head end 130 and IP provisioning system 110, respectively, establish MAC (medium access control) layer and IP (internet protocol) layer connectivity with the customer's computer, assigning the computer a temporary IP address. As will be appreciated, the customer's computer may also be connected to the ITV network. Because the set-top box computer function is a separate computational component from the modem, the same steps set forth above in boxes 464 and 468 (FIG. 8) are followed to establish MAC and IP layer connectivity with the set-top box computer function. In other words, the standard procedures for establishing MAC layer connectivity with the head end 130 as set forth in DOCSIS specification SP-RFI-I05-991105 and for establishing IP layer connectivity with the IP provisioning system 110 as set forth in DHCP specifications (RFC-2131) are followed by the network. As a result of this procedure, the set-top box computer function in box 492 (FIG. 8) will be placed in an "Unprovisioned Consumer Premises Equipment" state and assigned a temporary IP address.

In box 496 (FIG. 8), the IP provisioning system updates its database accordingly.

Figure 8:
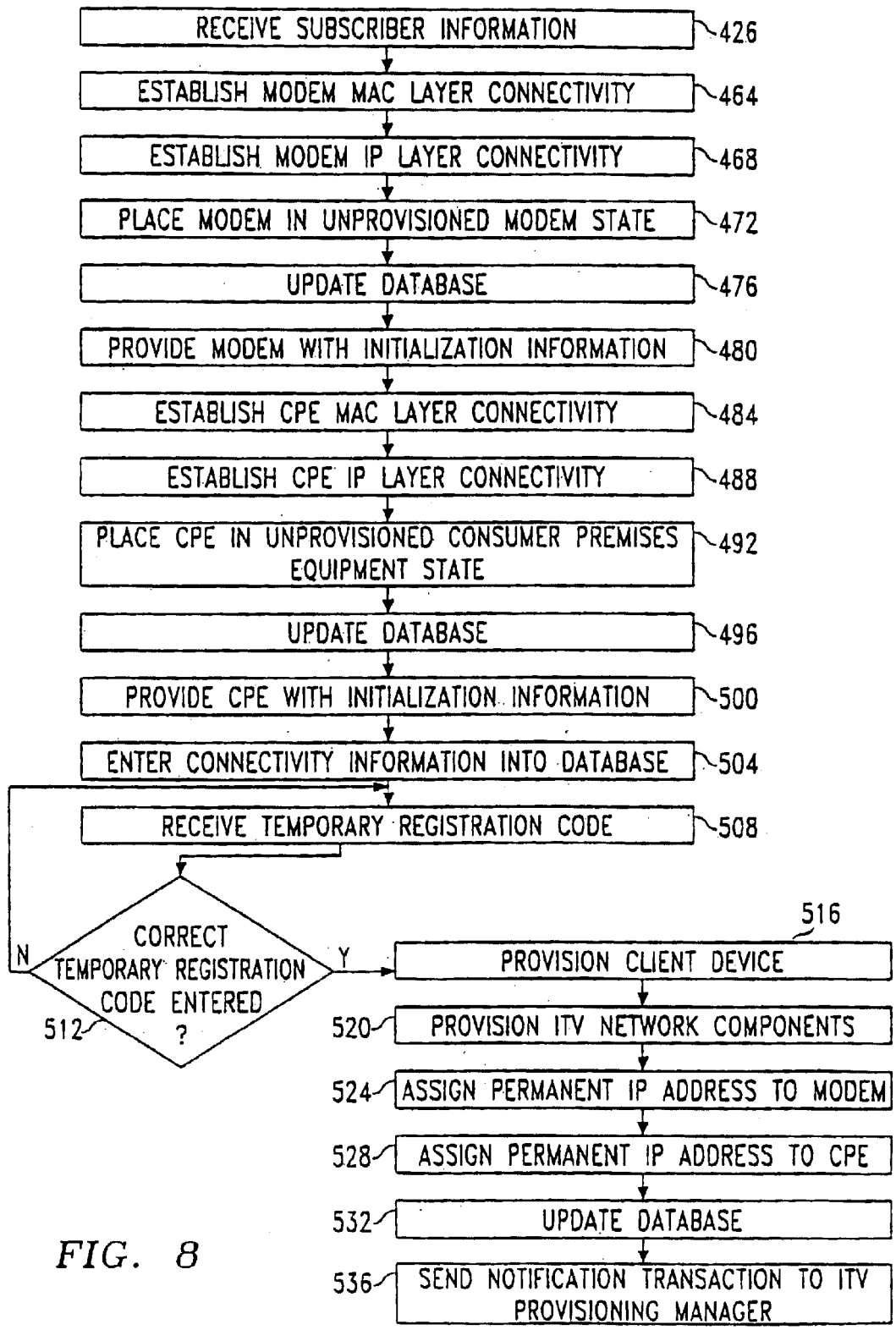
FIG. 8 is a flowchart of the provisioning process steps performed by the IP provisioning system of the ITV network.
Figure 9:
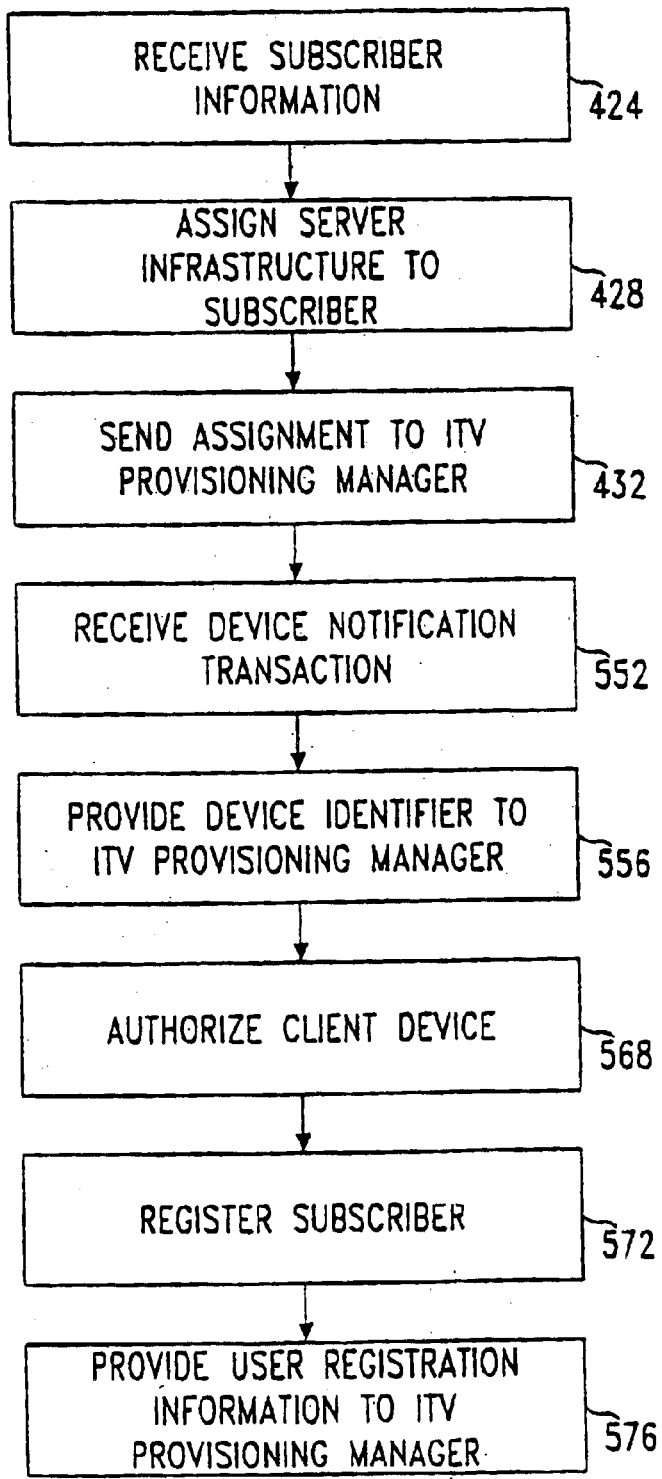
FIG. 9 is a flowchart of the provisioning process steps performed by a server infrastructure of the ITV network.

In box 500 (FIG. 8), the set-top box computer function obtains initialization information in the same manner as the modem in box 480 (FIG. 8). At this point, fill set-top box IP connectivity is achieved, but the set-top box is only routable to a server of the IP provisioning system 110. In box 504 (FIG. 8), the connectivity-related information provided to the IP provisioning system 110 in boxes 464–500 is entered into the system's database.

The technician will thereafter initiate a browser session. The first-time universal resource locator ("URL") is configured to go to the initial registration routing server 117. However, the IP provisioning system 110 will route/resolve all IP requests to the IP provisioning system registration page. The service technician/customer is present with a login/registration page. In box 508 (FIG. 8), the technician/customer enters the temporary registration code from the work order. In decision diamond 512 (FIG. 8), the IP provisioning system determines if the correct registration code is entered. If so, the set-top box is provisioned in box 516. In box 520 (FIG. 8), the IP provisioning system will provision ITV network components (e.g., servers, head end 130, and routers(not shown)) and updates its database to reflect that the box is provisioned.

If an incorrect temporary registration code is entered, the IP provisioning system 110 provides the technician/customer with a new login/registration page requesting reentry of the code. The IP provisioning system 110 repeats box 508 and decision diamond 512 upon receipt of a reentered code.

In boxes 524 and 528 (FIG. 8), the network assigns a separate, permanent IP address to the set-top box modem and computer functions, respectively and updates its database in box 532 (FIG. 8). The procedure followed by the network to assign the permanent IP addresses to these components is set forth in Simple Network Management Protocol ("SNMP") standard protocol. Briefly, an SNMP command causes the DOCSIS channel to reset. A server in the IP provisioning system 110 issues the set-top box computational component (modem or computer) a permanent IP address. The computational component is then placed in the Provisioned State (known as the "Provisioned Modem State" for the modem and the "Provisioned Consumer Premises Equipment State" for the computer function). The IP provisioning system's database is updated with DHCP information (including the permanent IP addresses assigned to the computational components). At this point, the customer is online with a permanent IP address.

In box 536 (FIG. 8), the IP provisioning system 110 generates a device notification transaction to the ITV provisioning manager 104 that links the set-top box unit address, and the IP and MAC addresses of the set-top box and computer to the subscriber key of the billing system 114.

In box 540 (FIG. 7), the device notification transaction is received by the ITV provisioning manager 104. In response, the ITV provisioning manager 104 in box 544 (FIG. 7) generates a device notification transaction providing this information (e.g., the subscriber key, unit address, MAC addresses, and IP addresses) to the billing system 114 and in box 548 (FIG. 7) a device notification transaction providing some of this information (e.g., subscriber key, unit address, MAC addresses) to the corresponding service server infrastructure 118 assigned to the customer.

The billing system in box 550 receives the device notification transaction and in box 551 enters the transaction into the billing system database. The registration server 154 in box 552 receives the notification transaction and in box 556 assigns a unique device identifier to the set-top box and provides the identifier and unit address to the ITV manager. Through communication with the registration server 154, the initial registration routing server 117 will now be aware of the installed set-top box.

The manager in box 560 (FIG. 7) receives the unique device identifier assigned to the set-top box by the registration server 154 in the infrastructure and unit address (discussed supra). In box 564 (FIG. 7), the presence of the ITV client device on the ITV network and its associated information (e.g., subscriber key, unit address, MAC addresses, IP addresses, and device identifier) is stored in the ITV Provisioning Manager data storage 228.

In box 568, (FIG. 9) the set-top box is authorized within the service server infrastructure environment. Upon initial connection to the network (after the completion of the foregoing steps), the set-top box will connect directly with the initial registration routing server 117. The set-top box will be configured to the assigned service server infrastructure 118 and given a registration server universal resource locator ("URL") for the registration server 154 located within the assigned infrastructure.

In box 572 (FIG. 9), the subscriber registers with the registration server 154 of the assigned infrastructure 118. Typically, this is done by providing the customer with one or more subscription screens containing user account set-up and login information. For example, the customer will select and/or set up an email address, calendar, address book, and other features for each user account to be created. In response, the provisioning system (not shown) of the infrastructure 118 will set-up and provision the required user accounts for each of the selected services.

In box 576 (FIG. 9), the provisioning system of the infrastructure 118 provides, for each user, this account information, e.g., subscriber key, service group identification, user identification, e-mail set-up information (i.e., login and password information), etc., to the ITV provisioning manager 104. As noted, each user in a given household will typically have the same subscriber key and service group identification but different user-specific information, such as user identification and e-mail set-up information.

In box 580 (FIG. 7), the ITV provisioning manager 104 receives the registration information and in box 584 forwards certain of the information, e.g., subscriber key, e-mail login, and e-mail password for each user account, to the billing system 114.

In box 588 (FIG. 6), the billing system 114 receives the registration information and in box 592 creates appropriate data structures and enters this information into the billing system's database (not shown). The billing system 114, for example, creates a unique billing identifier for each user that is different from the user identification provided by the infrastructure 118. This information is used by the billing system for billing and support services.

In box 693 (FIG. 7), this information (e.g., subscriber key, service group identification, user identification from server infrastructure 118, billing identifier from billing system 114, e-mail set-up, etc. is entered into data storage 228 of the ITV provisioning manager.

As will be appreciated, all message communications transactions between the ITV provisioning manager and the provisioning systems of the billing system 114, the IP provisioning system 110, the server infrastructure 118 and related initial registration routing server 117, and such other ITV network components comprising the ITV network are conducted via appropriate protocol and signal interfaces and APIs defined for each respective ITV network component provisioning system.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. By way of example, the ordering or sequence of the steps may be reversed or rearranged in an order other than that set forth above. Steps may be omitted from the provisioning process. ITV network components described above can be omitted or replaced by other ITV network components. Moreover, the teachings of the present invention are not limited to ITV networks but are extendible to any network offering good(s) or service(s) to subscribers or nonsubscribers. These and other changes may be made without departing from the spirit and scope of the present invention.

What is claimed is:

1. A system for managing the intercommunication of provisioning-related data between interconnected provisioning systems in an interactive television (ITV) network, the system comprising:
   an ITV Provisioning Manager device having a plurality of interfaces;
   a plurality of ITV Network Components, the plurality of ITV Network Components including an IP provisioning system, a subscriber management billing system, an ITV service server, and a customer service center;
   each of the ITV Network Components having an associated provisioning system, wherein the associated provisioning systems of the ITV Network Components are individually connected to respective ones of the interfaces of the ITV Provisioning Manager device in order for the associated provisioning systems of the ITV Network Components and the ITV Provisioning Manager device to communicate provisioning-related data with one another for the ITV Provisioning Manager device to manage provisioning of the ITV Network Components; and
   an ITV Client Device having an associated provisioning system connected to at least one of the ITV Network Components in order for provisioning-related data to be communicated between the associated provisioning system of the ITV Client Device and the ITV Network Manager device via the associated provisioning system of the at least one of the ITV Network Components connected to the ITV Client Device for the ITV Provisioning Manager device to manage provisioning of the ITV Client Device;
   wherein the associated provisioning system of the ITV Client Device is individually connected to a respective one of the interfaces of the ITV Provisioning Manager device in order for the associated provisioning system of the ITV Client Device and the ITV Provisioning Manager device to communicate provisioning-related data directly with one another for the ITV Provisioning Manager device to manage provisioning of the ITV client device, wherein the ITV Client Device is associated with a subscriber of the ITV network.

2. The system according to claim 1, wherein the at least one ITV Network Component and its associated provisioning system connected to said ITV Provisioning Manager includes at least one communications network.

3. The system according to claim 2, wherein the at least one communications network is a wired or wireless communications network.

4. The system according to claim 3, wherein the at least one communications network includes a packet data network.

5. The system according to claim 4, wherein the packet data network includes an IP data packet network.

6. The system according to claim 4, wherein the packet data network includes an ATM network.

7. The system according to claim 3, wherein the at least one communications network includes a circuit-oriented switched telephone network.

8. The system according to claim 1, wherein the ITV service server includes at least one of the following: an e-mail server, an address book server, a calendar server, a search server, a registration server, a web server, and an E-chat server.

9. The system according to claim 1, wherein the ITV Client Device includes a set-top video/audio converter decoder box.

10. The system according to claim 1, wherein the ITV Client Device includes a television set.

11. The system according to claim 1, wherein the ITV Client Device includes a device which processes video, audio or data signals for transmission, storage, visual display or sound emission.

12. An interactive television (ITV) provisioning apparatus for managing the intercommunication of provisioning-related data between interconnected provisioning systems in an ITV network, the ITV network including a plurality of ITV network components with each ITV network component having an associated provisioning system, wherein the ITV network components include an IP provisioning system, a subscriber management billing system, an ITV service server, and a customer service center, the ITV provisioning apparatus comprising:

a data storage device for storing provisioning-related data;

a plurality of provisioning message interfaces, each of the provisioning message interfaces being operable to be individually connected to respective provisioning systems associated with the ITV network components;

an operator interface;

a controller, connected with the data storage device, the provisioning message interfaces, and the operator interface, that transmits and receives provisioning-related data messages, via the provisioning message interfaces, to and from the provisioning systems associated with the ITV network components to manage provisioning of the ITV network components, and stores a record of said data messages in the data storage device.

13. The apparatus according to claim 12, wherein at least one of the provisioning message interfaces is an XML interface.

14. The apparatus according to claim 12, wherein at least one of the provisioning message interfaces is an XML interface type, connecting the apparatus with a provisioning system of at least one communications network.

* * * * *